March 30, 1954 — G. W. CRABTREE — 2,673,625
SPRING CONTROLLING MEMBER
Filed April 6, 1950 — 2 Sheets-Sheet 1
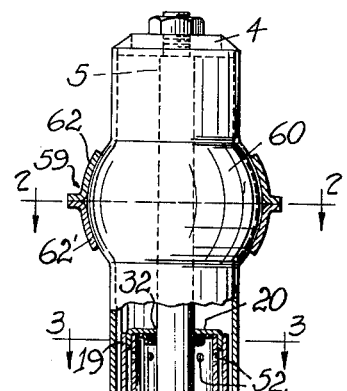
Fig. 1
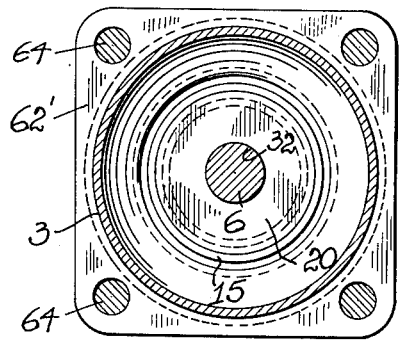
Fig. 2
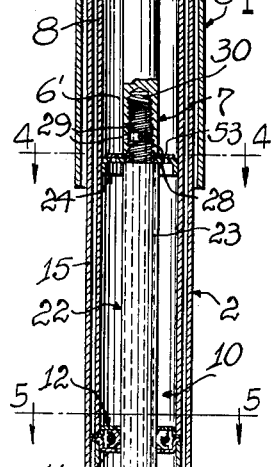
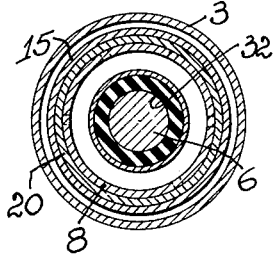
Fig. 3   Fig. 4
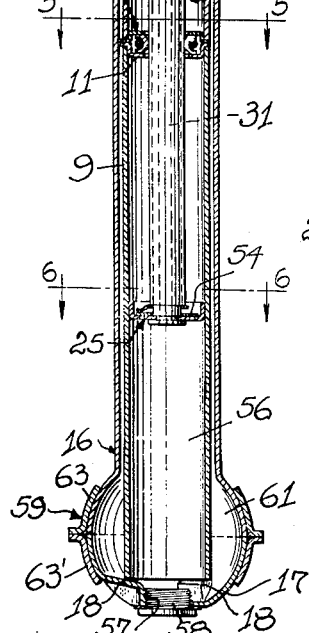
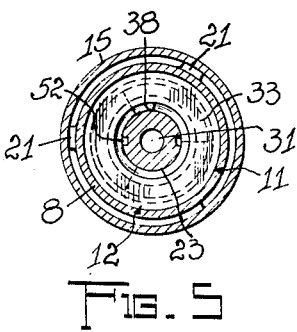
Fig. 5   Fig. 6
INVENTOR.
GEORGE W. CRABTREE
BY
ATT March 30, 1954   G. W. CRABTREE   2,673,625
SPRING CONTROLLING MEMBER
Filed April 6, 1950   2 Sheets-Sheet 2
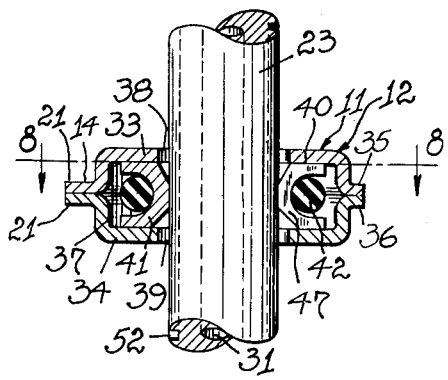
Fig. 7
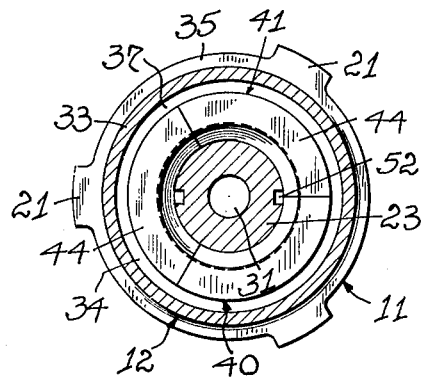
Fig. 8
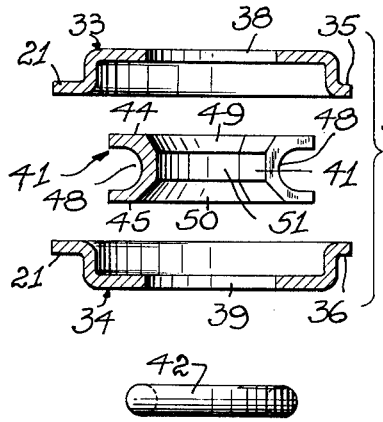
Fig. 10
Fig. 11
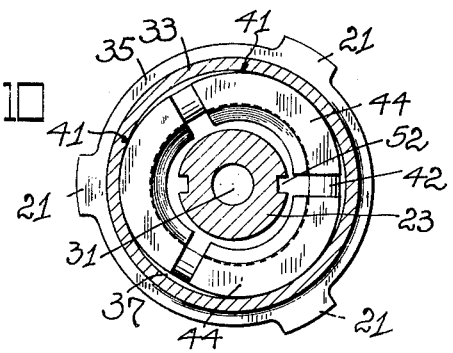
Fig. 9
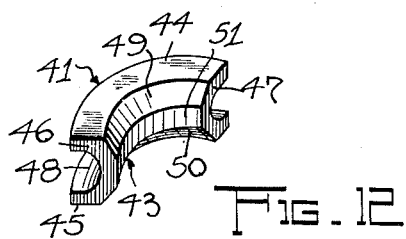
Fig. 12
INVENTOR.
GEORGE W. CRABTREE
BY
ATT.

Patented Mar. 30, 1954

2,673,625

UNITED STATES PATENT OFFICE 2,673,625

SPRING CONTROLLING MEMBER

George W. Crabtree, Cleveland Heights, Ohio

Application April 6, 1950, Serial No. 154,408

8 Claims. (Cl. 188—88)

The present invention relates in general to valve constructions, and, more particularly to valve constructions suitable for hydraulic spring controlling means effecting checking and retarding of spring movements by forcing liquid in either direction through the valve constructions. Presently used valve constructions of this type control the flow of liquid therethrough by either different sets of jointly controlled passages or a single set of individually or group-controlled passages; however, in these constructions the combined cross section of the active liquid passages is constant and prohibits proper checking or retarding action of spring movements by hydraulic spring controlling means embodying such valve constructions. Combined cross sections of the active liquid passages are now evaluated by taking into consideration all possible conditions present in springs under compression and reflex stresses.

The general object of this invention is the provision of a valve construction for hydraulic spring-controlling units which construction embodies pressure controlled passage means having differentially varying cross section changeable by pressure variations such as present in spring-controlling operations to provide hydraulic spring-controlling units having liquid flow controlling passages of differentially varying size to continuously control the checking or retarding action of such hydraulic spring-controlling units.

Another object of the invention is the provision of a valve construction for hydraulic spring controlling units, which construction embodies a plurality of coordinated pressure-controlled passages, each adapted to differentially change its cross section by pressure variations such as present in spring-controlling units during spring-controlling operations to provide hydraulic spring-controlling units having liquid flow controlling passages of differentially varying cross sections to continuously control the checking or retarding action of such hydraulic spring controlling units.

A further object of the invention is the provision of a valve construction for hydraulic spring-controlling units which construction embodies a plurality of associated valve elements arranged and shaped to form the valve construction with pressure-controlled, variable liquid passages adapted to differentially change their cross sections by pressure variations such as caused in hydraulic spring controlling units during spring-controlling operations, to provide hydraulic spring-controlling units having liquid flow-controlling passages of differentially varying cross section for continuously and properly controlling the checking and retarding action of such hydraulic spring-controlling units.

Still another object of the invention is the provision of a valve construction for hydraulic spring-controlling units, which construction embodies a plurality of associated valve sectors arranged and shaped to form the valve construction with pressure-controlled variable liquid passages adapted to differentially change their cross sections by pressure variations such as present in hydraulic spring-controlling units during spring-controlling operations, the valve sectors having their opposite end faces openly exposed and shaped to effect different variations in the cross section of said variable liquid passages when one or the other one of the end faces of the valve sectors are exposed to equal hydraulic pressure, to provide hydraulic spring-controlling units having liquid flow controlling passages of differentially varying cross section for continuous proper control of the checking action and a different, continuous proper control of the retarding action of such hydraulic spring-controlling units.

Additional objects and novel features of construction, combination and relation of parts by which the objects in view have been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a longitudinal sectional view partly in elevation of a double-acting hydraulic spring-controlling unit embodying a valve construction according to the invention;

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 1;

Fig. 5 is a cross-sectional view taken on line 5—5 of Fig. 1; and

Fig. 6 is a cross-sectional view taken on line 6—6 of Fig. 1;

Fig. 7 is an enlarged sectional view through the valve construction with the piston rod extended therethrough;

Fig. 8 is a cross-sectional view taken on line 8—8 of Fig. 7;

Fig. 9 is a cross-sectional view similar to Fig. 7 with the valve sectors in open position;

Fig. 10—sectional views of the elements forming the valve structure;

Fig. 11 is a side view of the rubber ring which yieldingly holds the valve sectors in proper relationship; and Fig. 12 is a perspective view of one of the valve sectors.

Referring now in detail to the exemplified form of the spring-controlling unit shown in the drawing and embodying a valve structure constructed in accordance with the invention, reference numeral 2 denotes a double-acting hydraulic spring controlling unit which includes a tubular shielding sleeve 3 closed at its upper end by a top plate 4 which has secured thereto the end 5 of the piston rod 6 of a piston device 7. This piston device cooperates with the two cylinders 8 and 9 of a working chamber arrangement 10 formed by the axially aligned cylinders 8 and 9 and spaced from each other by the housing 11 of a valve structure 12 to be later described.

Cylinders 8 and 9 are tightly held in engagement with the flanged portion 14 of housing 11 by an elongated tube 15 having a somewhat larger inner diameter than the outer diameter of cylinders 8 and 9. For such purpose tube 15, the lower end 16 of which is partly ball-shaped, as will be later described, has the bottom 17 of its end portion shaped to form inwardly extended seat portions 18 which seat cylinder 9 and, furthermore, has the upper end 19 welded to a perforated cap member 20 covering the cylinder 9 and attached thereto by welding. The described arrangement holds housing 11 of valve structure 12 rigidly in proper position, which in turn by ribs 21 on housing 11 cooperates with the cap member 20 and the downwardly inclined seat portions 18 in axially aligning tube 15 with the cylinders 8 and 9 enclosed thereby.

The two axially aligned cylinders 8 and 9 form the working chamber arrangement 10 for piston device 7 which in shock absorbing operations forcibly shifts liquid from one cylinder through the valve structure 12 (to be described later) into the other one of said cylinders, and vice versa.

Piston device 7 consists of a piston couple 22 embodying a tubular rod 23 mounting on its opposite ends pistons 24 and 25. Piston 25 consists of a flanged disk 26 provided with valve controlled openings 27 and is attached to the lower end of tubular rod 23; and piston 24, constructed similar to piston 25, and provided with valve-controlled openings 28', is secured to the other end of tubular rod 23 by the internally threaded tubular end portion 28 of piston rod 6. The end portion 28 includes a plurality of cross bores 29 which intersect threaded bore 30 in piston rod 6 and thus effect open communication of axial passage 31 in tubular rod 23 with cylinder 8.

Piston device 7 is dimensioned so that pistons 24 and 25 of its piston couple 22 are positioned in cylinders 8 and 9, respectively, and that piston rod 6 slidably extends through a circular opening 32 in cap member 20, all for the purpose of permitting the necessary relative movements for spring controlling action between the working chamber arrangement 10 and the piston couple 22.

Valve structure 12 affords controlled communication between cylinders 8 and 9 and embodies a ring-shaped housing 11 which consists of two symmetrically shaped, perforated and flanged cup-shaped elements 33 and 34 engaged with each other by their circumferential flanges 35 and 36. Housing 11 forms together with tubular rod 23 a ring-shaped working chamber 37 when such tubular rod is extended through the circular central openings 38 and 39 in elements 33 and 34, respectively. This ring-shaped working chamber shiftably mounts a valve 40 composed of a plurality of sector-like valve elements 41 which are assembled to form the ring-shaped valve member (see Fig. 8) the individual valve elements 41 of which are yieldingly held in proper position with respect to each other by a rubber ring 42 encircling valve member 40. The described arrangement permits differential opening up of valve member 40 against the tension of rubber ring 42 when in operation of the hydraulic spring controlling unit, liquid is forced by pistons 24 or 25 from cylinder 8 through valve member 40 into cylinder 9 and vice versa. In this case liquid under pressure forces the individual elements 41 against the tension of rubber ring 42 outwardly and increases the cross section of the liquid passing area of valve 40. A decrease in the pressure of the working liquid reduces the cross section of the liquid passing area of valve 40 as rubber ring 42 tends to shift elements 41 so as to close the cross section of the liquid passing area of the valve.

Valve elements 41 are shifted by liquid under pressure acting on either side of valve 40 in reciprocatory movements of piston couple 22 and consequently the spring controlling unit 2 controls both compression and reflex stresses of vehicle springs. All valve elements 41 are identically constructed, each embodying a ring sector body 43 having flat top and bottom faces 44 and 45 and flat end faces 46 and 47 angularly related to each other in planes intersecting the axis of the ring body of valve 40 formed by valve elements 41. Each valve element includes in its outer wall a channel 48 to properly seat and retain rubber ring 42 yieldingly holding these valve elements in proper relation with respect to each other. In addition each valve element 41 includes inwardly inclined wall portions 49 and 50, wall portion 49 extending from the top face 44 toward the inner wall 51 of the valve element and wall portion 50 extending from the bottom face 45 to such inner wall 51. The projected areas of the inclined wall portions 49 and 50 projected upon a cylindrical surface coaxial with tubular rod 23 control the ratio of force tending to effect shifting of valve elements 41 for an increase in the liquid passing area of valve 40 against the yielding force of rubber ring 42 which tends to decrease such liquid passing area. The construction provides a simple and economic means to properly size the liquid passage area of valve 40 for all practical purposes. Preferably, as shown, tubular rod 23 has arranged in its outside wall elongated recesses 52 permitting dispensing of small amounts of liquid from cylinder 8 to cylinder 9 and vice versa, without opening up of valve 40. The inclined wall portions 49 and 50 of elements 41 preferably differentiate in the size of their projected areas to attain the desired ratio of force effecting opening up of valve 40 to properly control compression and reflex stresses of vehicle springs. Reciprocatory movements of piston couple 22 in cylinders 8 and 9 force liquid under pressure through valve 40 from one cylinder into the other one and also displace liquid from said other cylinder into said one cylinder and vice versa. Such displacement of the liquid is effected through the axial passage 31 in tubular rod 23 and through cross bores 29 in piston rod 6, and, in addition through the elongated tube 15 communicating with the open end of cylinder 9 and through openings 52 with the end of cylinder 8, which openings are arranged in cylinder 8 adjacent to its cap member 20. This displacement of liquid from one cylinder to the other one and vice versa takes place at practically no pressure as the passages guiding such liquid are sufficient in cross section to permit displacement of liquid without building up of back pressure.

The two pistons 24 and 25, as previously stated, include valve controlled openings 28' and 27. Openings 28' in piston 24 being covered by a heavy spring steel valve member 53 which uncovers the openings 28' in said piston only under excessive pressure in cylinder 8 and at a time when piston 24 travels toward valve member 40 to prevent damage to the spring controlling unit. Openings 27 in piston 25 are controlled by a spring-pressed disk valve member 54 held in closing position by a light spring 55 permitting opening up of openings 27 and entering of liquid from lower fluid storing portion 56 of cylinder 9 when piston 25 travels away from valve member 40.

The hydraulic spring controlling unit which may be filled or refilled through a threaded opening 57 at the lower end portion of tube 15 after removal of screw cap 58 closing said opening, is secured to the frame and axle of an automobile by bracket members 59 universally shiftably mounted on spherical bulges 60 and 61 on tubular shielding sleeve 3 and the lower end of tube 15. These bracket members embody two symmetrically constructed portions 62, 62' and 63, 63', respectively, which are secured to each other by bolts 64.

When attached to the frame and axle of an automobile, relative movements between frame and axle effect shifting of the piston couple 22 in cylinders 8 and 9. On the downward stroke of the piston couple, piston 24 in cylinder 8 forces liquid from cylinder 8 through the valve structure 12 into cylinder 9, and piston 25 in cylinder 9 shifts liquid from cylinder 9 unimpeded through axial passage 31 and through tube 15 into cylinder 8. In this action liquid under pressure passes through the valve structure and regulates the size of its liquid flow passage proportionate to the pressure exerted by the liquid on the inclined pressure faces 49 of elements 41, yieldingly held in proper working position by rubber ring 42 or a similar yielding means. On the upward stroke, the piston couple effects in a similar manner forcible displacement of liquid from cylinder 9 into cylinder 8 and unimpeded shifting of liquid from cylinder 8 into cylinder 9, as will readily be understood from inspection of Fig. 1. The choking action of valve structure 12 is in this latter case different and opposite to the previously described choking action of valve structure 12 as the pressure faces 50 of the elements 41 are different in area and inclination than the pressure faces 49 of the elements 41, and as piston couple 22 travels in an opposite direction.

Having thus described my invention, what I claim is:

1. In a pressure-controlled valve construction, a valve housing having a valve chamber and an axial through passage intersecting said valve chamber, and a valve member assembly in said valve chamber intersecting the through passage and effecting control of the cross sectional area of said through passage, said valve member assembly consisting of a plurality of individual, shiftable, sector-like elements arranged to form a circular valve member, and a ring-shaped yielding member encircling said circular valve member to yieldingly hold same in proper position, said sector-like elements having top and bottom faces and including in their top and bottom faces inclined surface portions exposed to the top and bottom portions of said through passage to effect controlled shifting of said elements against the force of said ring-shaped member for control of the cross sectional fluid passage area of the valve construction by fluid pressures exerted at the top and bottom portions of said through passage on the inclined surface portions of said elements.

2. A pressure-controlled valve construction as described in claim 1, wherein said valve housing consists of two cup-shaped, flanged portions, and wherein said flanged portions are seated upon each other in inverted position with respect to each other.

3. A pressure control valve construction as described in claim 1, wherein said inclined surface portions on the top and bottom surfaces of said sector-like elements differentiate in the size of their projected areas upon a cylindrical surface co-axial with the valve housing.

4. In a pressure-controlled valve construction a valve housing having a valve chamber with top and bottom faces and an axial through passage intersecting said valve chamber, a valve member assembly in said valve chamber including valve elements slidably contacting the top and bottom faces of said valve chamber, and means axially aligning said valve member assembly with respect to said through passage, said valve elements having sector-like shape and being arranged in radial relation with respect to said through passage, said alignment means including yielding means holding said valve elements in proper position with respect to each other, and each of said valve elements including top and bottom faces parallel to and contacting the top and bottom faces of said valve chamber and inclined surface portions in said top and bottom faces adapted to effect controlled shifting of the valve elements with respect to said through passage by pressure acting on the said valve member assembly.

5. The combination of a pressure controlled valve construction and a hydraulic, cylinder piston type spring controlling unit including a cylinder member, a piston and a piston rod attached to said piston, said valve construction embodying a valve housing arranged in the cylinder and formed with a valve chamber and a through passage axially intersecting the valve chamber, and a ring-shaped valve assembly shiftably supported in said valve housing and guided between the top and bottom walls thereof, said ring-shaped valve assembly having sector-like valve elements arranged radially with respect to each other and held in this relationship by yielding means, the piston rod of the spring controlling unit being extended through the through passage of the valve housing and through the central opening of the ring-shaped valve assembly to shift the sector-like valve elements of such assembly by said yielding means into radial contact with the piston rod and axially align the ring-shaped valve assembly with the through passage of the valve housing.

6. The combination of a pressure controlled valve construction and a double action spring controlling unit having two axially aligned cylinder members and a piston couple arranged in said cylinders and shiftably supported thereby, said piston couple embodying spaced pistons and a piston rod connecting same, said valve construction having a valve housing mounted between said cylinder members in axial alignment therewith, and said valve housing including a valve chamber and a through passage axially intersecting such valve chamber and a ring-shaped valve assembly shiftably arranged within the valve chamber and guided between top and bottom walls thereof, said ring-shaped valve assembly having sector-like valve elements radially arranged with respect to each other and held in this relationship by yielding means, the piston rod of the spring controlling unit being extended through the through passage of the valve housing and through the central opening of the ring-shaped valve assembly to shift the sector-like valve elements by said yielding means into radial contact with such piston rod and axially align the ring-shaped valve assembly with the through passage of the valve housing.

7. The combination described in claim 6, wherein the housing of said valve construction is mounted between the opposed inner end portions of the axially aligned cylinder members, and wherein a single elongated tubular member is sleeved over said cylinder members and engaged with the outer end portions thereof for securely holding the cylinder members and the valve construction in proper working position.

8. The combination described in claim 6, wherein the housing of said valve construction is flanged and wherein the flanged portion of the housing is arranged between the opposed inner end portions of the walls of the axially aligned cylinder members, wherein a single, elongated tubular member with somewhat larger inner diameter than the outer diameter of said cylinder members is sleeved over such cylinder members and engaged with the outer end portions thereof for securely holding the cylinder members and the valve construction in proper working position and wherein communicationg passages effect communication between outer end portions of the cylinder members and the outer end portions of the single tubular member.

GEORGE W. CRABTREE.

References Cited in the file of this patent

FOREIGN PATENTS

| Number | Country | Date |
| --- | --- | --- |
| 38,601 | Sweden | 1915 |
| 630,363 | Germany | 1936 |